United States Patent [19]

Noren et al.

[11] 4,278,013
[45] Jul. 14, 1981

[54] APPARATUS FOR PREPARING A HOT LIQUID MEDIUM, PREFERABLY WARM OR HOT BEVERAGES, SUCH AS TEA AND COFFEE

[76] Inventors: Kurt L. R. Noren; Lennart N. Noren, both of Pukslagargatan 45, 125 30 Älvsjö, Sweden

[21] Appl. No.: 654,795

[22] Filed: Feb. 3, 1976

[30] Foreign Application Priority Data

Feb. 14, 1975 [SE] Sweden ............................ 7501649

[51] Int. Cl.³ .................................... A47J 31/057
[52] U.S. Cl. ........................... 99/288; 99/300; 99/304
[58] Field of Search ............... 99/288, 282–283, 99/299, 300, 304–305, 317–318, 326, 339, 348; 126/369

[56] References Cited

U.S. PATENT DOCUMENTS

| | | | |
|---|---|---|---|
| 2,637,266 | 5/1953 | Grado | 126/369 X |
| 2,829,583 | 4/1958 | Leonard | 99/282 |
| 3,100,434 | 8/1963 | Bunn | 99/282 |
| 3,463,075 | 8/1969 | Wickenberg | 99/304 X |
| 3,518,933 | 7/1970 | Weber | 99/283 |
| 3,530,276 | 9/1970 | Wells | 99/282 X |
| 3,691,933 | 9/1972 | Martin | 99/282 |
| 3,693,535 | 9/1972 | Abel | 99/288 |

Primary Examiner—Harvey C. Hornsby
Assistant Examiner—Arthur O. Henderson
Attorney, Agent, or Firm—Burns, Doane, Swecker & Mathis

[57] ABSTRACT

An apparatus for preparing warm or hot beverages (tea or coffee) in which cold or luke-warm water is passed to a container and caused to flow through the apparatus in order to be heated. The water passes through a warm spreader, causing the water to be preheated before the latter is passed through the actual heating means.

6 Claims, 5 Drawing Figures

APPARATUS FOR PREPARING A HOT LIQUID MEDIUM, PREFERABLY WARM OR HOT BEVERAGES, SUCH AS TEA AND COFFEE

FIELD OF THE PRESENT INVENTION

The present invention relates to an apparatus for preparing a hot liquid medium, preferably warm or hot beverages, such as tea and coffee. The apparatus is adapted to receive cold or luke-warm liquid medium, which is preferably supplied to a container. The medium is heated during its flow through the apparatus and is then discharged. Although the apparatus of the invention can be used as soon as there is a need for the preparation of warm or hot liquid medium, such preparation being effected continuously at least during the passage of the medium through the apparatus starting with a cold or luke-warm medium, the following description will be made solely with the reference to an apparatus for the preparation of warm or hot beverages, so as to exemplify the practical use of the apparatus.

Thus, the apparatus according to the present invention can be advantageously used for preparing warm or hot beverages, in which case the cold or luke-warm medium is water. The water heated in the apparatus is passed through a vessel containing tea, coffee or the like, said vessel being provided with a sieve, a filter bag or the like and having an outlet for the hot beverage.

The apparatus according to the invention operates with a continuous flow. A cup or mug filled with luke-warm water is emptied into an upper vessel and while the water passes through the apparatus so as to be heated thereby the cup or mug is moved to the outlet through which the hot beverage subsequently passes to fill the cup or mug.

BRIEF DESCRIPTION OF THE PRIOR ART

Such apparatus are known per se but their efficiency is limited in certain respects. Such apparatus are also disturbingly noisy, this noise being caused by the fact that cold water is permitted to come in direct contact with a heated surface comprising the heating means.

An important feature for the correct function of the apparatus is that the water which is permitted to pass through the apparatus shall be warmed to the correct or a predetermined temperature. It is obvious that this temperature may be varied, although it should be maintained within predetermined limits. When the temperature of the heating means is excessively high, there is a risk that the water will boil, while when the temperature of the heating means is excessively low there is a risk that the water passing through the outlet will not be heated to the predetermined high temperature. It is more or less a prerequisite with previously known apparatus that the water supplied thereto must have a temperature lying within a predetermined range. It is assumed that the heating means has a constant temperature. When the temperature varies, the result is a temperature deviation in the hot water produced.

OBJECTS OF THE PRESENT INVENTION

An object of the invention is to eliminate this disadvantage and to provide an apparatus which preheat the luke-warm water to ensure that the water is heated to a temperature selected within determined limits when said water reaches the heating means.

An advantage of the apparatus according to the invention is that it works relatively silently.

BRIEF DESCRIPTION OF THE ACCOMPANYING DRAWINGS

The invention will now be more clearly described by way of example with reference to the accompanying drawings in which:

FIG. 1 is a perspective view of an apparatus according to the invention,

FIG. 2 is a side view in cross section of the internal components of the apparatus shown in FIG. 1, the components shown in cross-section constituting the significant structural elements according to the present invention, FIG. 3 is a bottom plan view of a portion of the apparatus which ensures pre-heating of the water, FIG. 4 is a top plan view of the heating surface which comprises the actual heating means and FIG. 5 shows a vessel having an outlet from which the hot or warm water is obtained.

DESCRIPTION OF A PREFERRED EMBODIMENT

Figure 1:
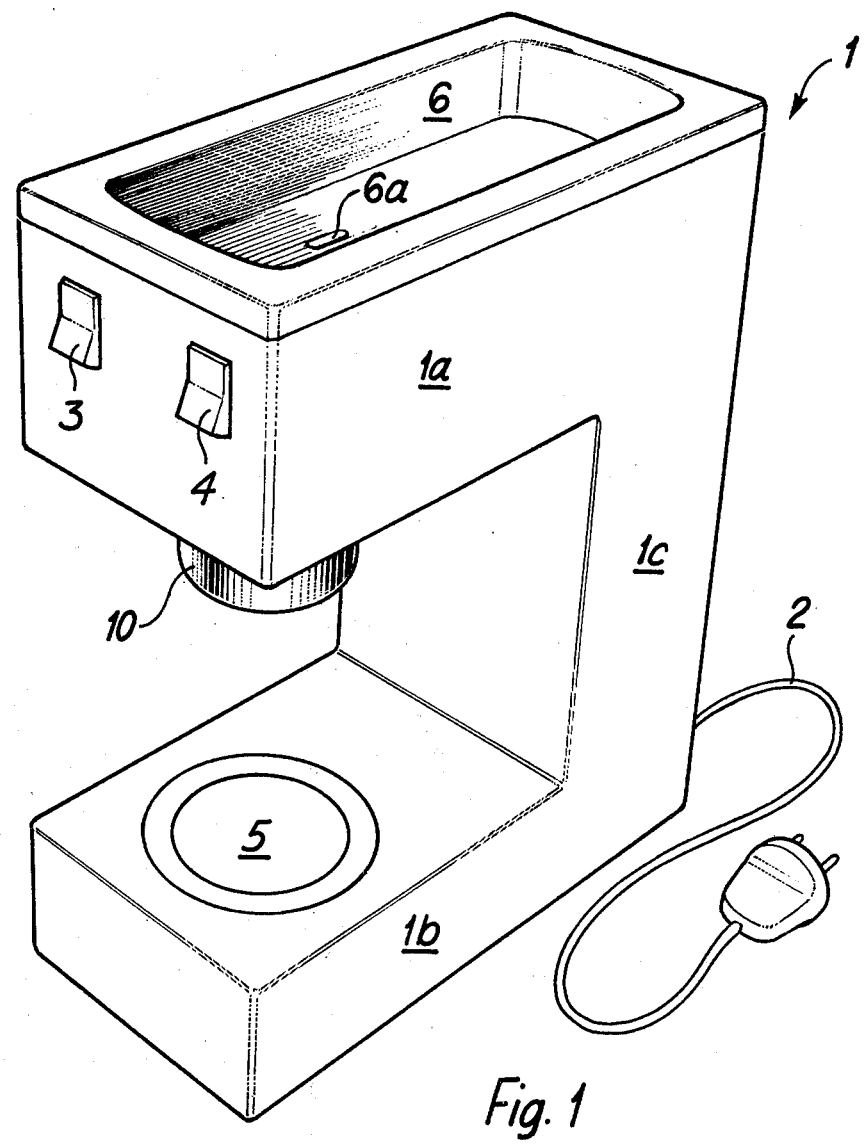

In FIG. 1 there is shown diagrammatically an apparatus for preparing a warm or hot liquid medium, such as a warm or hot beverage, for example tea or coffee. The apparatus 1 comprises an upper portion 1a and a lower portion 1b, said portions being joined by a portion 1c. The three portions form a U-shaped configuration. Power is supplied to the apparatus through a cable 2 which is connected to heating means forming part of the apparatus, said heating means being described in more detail below. The apparatus 1 also comprises various control means for regulating the temperature of the heating means. These control means may be of any type but shall be constructed for regulating temperature within small temperature differences. Since the control means do not form any part of the present invention, they have not been described. Energy can be supplied to the heating means and associated temperature-control means through a switch 3, and by means of a switch 4 it is possible to pass a heating current to an electrically-operated heating plate 5 mounted on a planar surface of the apparatus portion 1b. In this way, a mug or cup placed on the plate 5 can be warmed.

As will be seen from FIG. 1, the uppermost portion 1a of the apparatus is provided with a collecting or first vessel 6 which is provided with a central hole 6a serving as an outlet. This collecting vessel preferably comprises stainless steel and may conveniently be covered with a cover plate provided with a small sieve arrangement (not shown) placed immediately above the collecting vessel 6. The sieve plate has been omitted from FIG. 1 for the sake of clarity. The apparatus portion 1a is carried by the portion 1c, which in turn is joined to the portion 1b which supports the plate 5 in a manner such that said plate is located immediately beneath the outlet of the apparatus.

Figure 2:
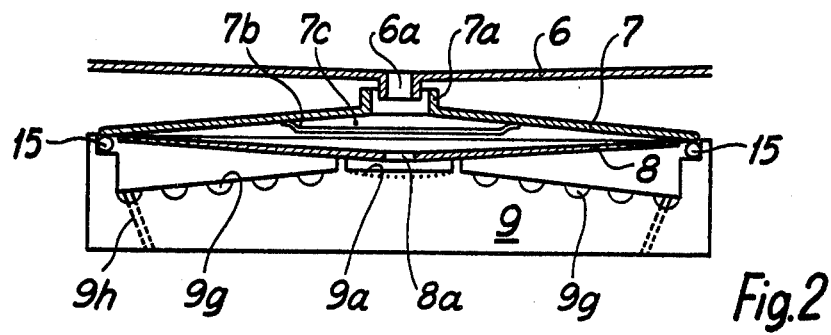

FIG. 2 is a vertical sectional view through a portion of the apparatus showing the components according to the invention. In FIG. 2 the collecting vessel 6 has only been partially indicated by its outlet 6a which has the form of a short tubular member extending somewhat beyond and beneath the collecting means 6. A spreader 7 is arranged immediately adjacent the outlet 6a, said spreader having a collar 7a which is arranged to cooperate with the outlet 6a. Collar 7a is adapted to encircle the outlet 6a. The spreader 7 comprises a circular curved plate and will be described in more detail with reference to FIG. 3. It may be mentioned, however, that the plate 7 has the form of a segment of a sphere with the convex surface facing the collecting means 6. Immediately beneath the spreader 7 there is arranged a curved collecting plate 8 which has a slightly concave configuration towards the collecting means 6 and which presents a central hole 8a. The water passing through the spreader 7 is collected on the collecting plate 8 and runs out through the outlet 8a onto a planar surface 9a associated with the heating means 9. Collecting plate 8 also has the form of a segment of a sphere.

Heating means 9 will now be described with reference to FIG. 4. Heating means 9 contains electrical heating elements (not shown) required for heating the water, said elements being connected to cable 2 via the switch 3 and temperature-control means (not shown) in a manner known per se. As will be understood, different heating coils may be provided and connected, depending upon the temperature required so that, in this way, the heating means can be heated to a predetermined temperature or to a temperature lying within certain limits.

Figure 3:
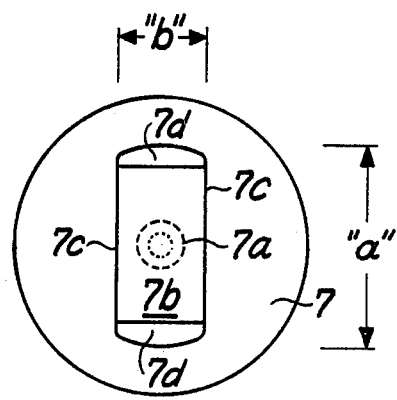

FIG. 3 shows a horizontal view from beneath the spreader 7 which comprises a circular plate having a collar 7a, shown in dotted lines. The actual spreader comprises a concave plate 7 having a centrally arranged inlet in the form of the collar 7a, the curved surface of the plate 7 facing the collecting means 6. A homogeneous bridge 7b extends over the central inlet 7a but leaves a passage between the bridge 7b and the plate 7. This passage is designated 7c. As will be seen from FIG. 2, the passage is somewhat enlarged owing to the fact that the bridge is given a curved form at those portions thereof adjacent its attachment to the plate 7. These curves are designated 7d.

The bridge extends from between 50 and 80% of the diameter of the circular plate, this measurement being designated "a" in FIG. 3. The measurement designated "b" in FIG. 3 should have a width which is approximately equal to 50% of the diameter of the circular plate, although this measurement can be reduced to 20% and increased to 70%. It is important, however, that the water passing to the spreader shall be spread by the bridge 7b over the collecting plate 8 and there be pre-heated so that, upon its passage through the outlet 8a, the water is given a predetermined temperature or a temperature which at least lies within predetermined limits.

Figure 4:
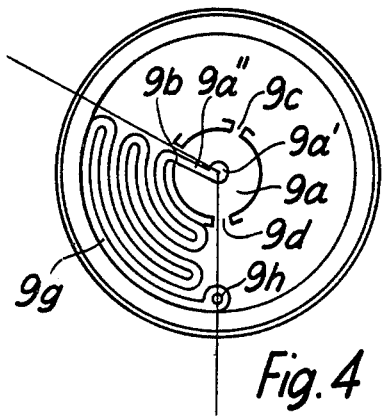
Figure 5:
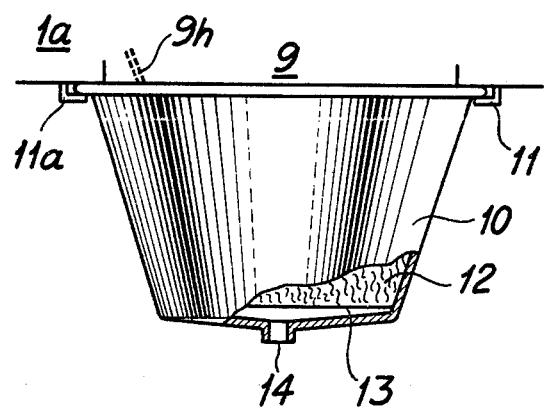

The heating means 9, which is shown in plan view in FIG. 4, has a central surface 9a on which the water passes subsequent to leaving the collecting plate 8. The heating means 9 is provided with three identical flow paths or "labyrinths" 9g only one of which is shown in FIG. 4 for the sake of clarity. The water which is collected on the surface 9a will pass through slots 9b, 9c or 9d and flow paths 9g.

If it is assumed that the water passes throught the slots 9b, it will pass the flow or labyrinth path 9g. After to the water passes the whole of this path and has been heated, it will pass through a hole 9h, also shown in FIG. 2. The hot water will now pass down into a container 10, located beneath the portion 1a but above the portion 1b having the heating plate 5. The container 10 is retained beneath the heating means 5 by means of brackets 11 and 11a. The hot water is now passed to a vessel 12 containing coffee, tea, or the like resting against a sieve 13. The hot water passes from the heating means 9 through the coffee, tea or the like and the sieve 13 and out through the outlet 14, it being assumed that an empty cup or mug is placed beneath said outlet so as to receive the beverage dispensed from the apparatus.

Although in the illustrated example the bridge 7b is shown to have a planar configuration, said bridge may also be curved, for example provided with a cylindrical surface or given the form of a segment of a sphere with the convex side facing upwards, causing the water to be spread out over the collecting plate 8.

The collecting plate 8 slopes downwardly towards the outlet 8a and this inclination should be less than 10°. Finally, the spreader 7 is urged towards the heating means 9 through pressure-exerting means (not shown) and a seal 15 is conveniently arranged between the spreader and the heating means.

The heating means 9, as can be seen from FIG. 2, presents a generally conical surface in the vertical section which tapers downwardly outward and is provided with a plurality of flow passages on the conical surface. As for further details, heating means 9 in the illustrated embodiment, this portion has been provided with a central recess 9a, preferably in the form of a segment of a sphere. The central recess is provided with a groove 9a" which discharges into the slot 9b and begins in the central recess.

The apparatus according to the invention operates in the following manner. Cold water contained in a cup or a mug is emptied into the collecting means 6. This water passes through the outlet 6a and falls onto the bridge 7b which causes the water to be spread over the collecting means 8. As will be apparent from FIG. 2, the collecting means 8 is not in direct contact with the heating means 9; but is indirectly heated by the latter. The water is heated here prior to it passing through outlet 8a to the surface 9a of heating means. The water then flows through the flow or labyrinth paths 9g, where the actual heating takes place. The heated water then passes through holes 9h. The heating means 9 has an outwardly-inclined surface.

The water which flows through the holes 9h has now been heated to the required temperature and passes to container 10, through coffee 12 and the sieve 13 and the hole 14, through which it runs into a cup or mug (not shown) placed on the plate 5.

The mug or cup used to fill the collecting means 6 can be used to receive the beverage at 14, owing to the time taken for the water to pass through the apparatus. As will be seen from the embodiment shown in the drawings, the flow passage 9g has the form of partly circular-shaped grooves in the surface comprising five arc-formed parallel grooves and five groove-connections at the ends.

The invention is not restricted to the described embodiments thereof, but can be modified within the scope of the following Claims.

What we claim is:

1. An apparatus for preparing a heated liquid medium, preferably warm or hot beverages in which cold liquid medium is supplied to the apparatus and is heated in passage therethrough, said apparatus comprising:
   (a) a first vessel for receiving cold liquid medium to be heated;
   (b) first outlet means in said first vessel for permitting passage of cold liquid therethrough;

(c) first heating means for preheating cold liquid medium in proximity to and below said first vessel, said medium passing from said first vessel;

(d) spreading means having inlet means adjacent said first outlet means for permitting passage of cold liquid from said first vessel to said spreading means, said spreading means being arranged to spread cold liquid passing through said first outlet means over said first heating means;

(e) second heating means in proximity to and below said first heating means for further heating preheated liquid medium to a higher, predetermined temperature, wherein the second heating means presents a generally conical surface which tapers downwardly outward and is provided with a plurality of flow passages on said conical surface:

each of said plurality of flow passages forming a labyrinthine channel proceeding from the top of said cone downwardly toward its base;

each of said plurality of flow passages being equally angularly spaced about the downward outward surface of the cone;

(f) second outlet means in said first heating means adjacent said second heating means for permitting preheated liquid medium from said first heating means to flow down to said second heating means.

2. An apparatus according to claim 1, wherein the flow passages are arranged as partially circular, labyrinthine grooves.

3. An apparatus according to claim 1, wherein three separate flow passages are arranged to cover the surface.

4. An apparatus for preparing warm or hot beverages, such as tea or coffee, in which cold water is supplied to the apparatus, said water being heated in passage therethrough and caused to flow through a body of tea or coffee, said apparatus comprising:

(a) a first vessel for receiving cold water to be heated;

(b) first outlet means in said first vessel for permitting passage of said cold water therethrough;

(c) first heating means for preheating said cold water comprising a curved collecting plate in proximity to and below said first vessel said water passing from said first vessel;

(d) spreading means interposed between said first outlet means and said first heating means for spreading said cold water passing through said first outlet means over said first heating means, said spreading means comprising:

(i) a concave plate having a centrally located inlet and (ii) a bridging member on said concave plate extending over said central inlet, said bridging member being spaced from the surface of said concave plate to provide a passageway therebetween;

(e) second heating means in proximity to and below said first heating means for further preheating water to a higher, predetermined temperature;

(f) second outlet means in said first heating means for permitting preheated water from said first heating means to flow down to said second heating means;

(g) third outlet means for the passage of heated water from said second heating means and for receiving heated water; and (h) a second vessel for containing a body of solid coffee or tea, said second vessel communicating with said third outlet means, said second vessel being provided with a sieve and outlet means for dispensing hot beverage.

5. An apparatus according to claim 4, wherein the bridge extends from between 50 and 80% of the diameter of the plate.

6. An apparatus according to claim 4, wherein the bridge has a width which is less than 50% of the diameter of the plate.

* * * * *